United States Patent
Xu et al.

(10) Patent No.: US 12,256,304 B2
(45) Date of Patent: Mar. 18, 2025

(54) METHOD AND DEVICE FOR PREPARING EMERGENCY CALL AND STORAGE MEDIUM

(71) Applicant: GUANGDONG OPPO MOBILE TELECOMMUNICATIONS CORP., LTD., Guangdong (CN)

(72) Inventors: Xin Xu, Palo Alto, CA (US); Yongsheng Shi, Palo Alto, CA (US); Jun Niu, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 404 days.

(21) Appl. No.: 17/750,542

(22) Filed: May 23, 2022

(65) Prior Publication Data
US 2022/0286835 A1    Sep. 8, 2022

Related U.S. Application Data (63) Continuation of application No. PCT/CN2020/128749, filed on Nov. 13, 2020.

(60) Provisional application No. 62/949,360, filed on Dec. 17, 2019.

(51) Int. Cl.
*H04W 4/90* (2018.01)
*H04W 8/26* (2009.01)
*H04W 76/50* (2018.01)

(52) U.S. Cl.
CPC .............. *H04W 4/90* (2018.02); *H04W 8/26* (2013.01); *H04W 76/50* (2018.02)

(58) Field of Classification Search
CPC .......... H04W 4/90; H04W 76/50; H04W 8/26
See application file for complete search history.

(56) References Cited

U.S. PATENT DOCUMENTS

| | | | | |
|---|---|---|---|---|
| 7,822,391 | B1* | 10/2010 | Delker | H04B 1/034 379/38 |
| 2006/0121877 | A1* | 6/2006 | Raghuram | H04W 76/50 455/404.1 |
| 2006/0172720 | A1 | 8/2006 | Islam et al. | |
| 2011/0059722 | A1* | 3/2011 | Abdel-Kader | H04M 1/72418 455/404.2 |

(Continued)

FOREIGN PATENT DOCUMENTS

| | | |
|---|---|---|
| CN | 101043748 | 9/2007 |
| EP | 1959659 | 8/2008 |

(Continued)

OTHER PUBLICATIONS

WIPO, International Search Report and Written Opinion for PCT/CN2020/128749, Jan. 27, 2021.

(Continued)

*Primary Examiner* — Duc C Ho
(74) *Attorney, Agent, or Firm* — Hodgson Russ LLP (57) ABSTRACT

A method for preparing an emergency call, a device for preparing an emergency call, and a storage medium are presented. The method includes detecting that a user of a device has initiated an emergency call, obtaining an indication of a current geographical location of the device, and, in response to the detecting and based on the obtained indication, selecting an emergency number to be called for the emergency call.

12 Claims, 6 Drawing Sheets

(56) References Cited

U.S. PATENT DOCUMENTS

| | | | |
|---|---|---|---|
| 2014/0179319 A1* | 6/2014 | Kim | H04W 36/302 |
| | | | 455/436 |
| 2015/0281929 A1* | 10/2015 | Shih | H04W 76/50 |
| | | | 455/552.1 |
| 2016/0345149 A1* | 11/2016 | Chuttani | H04W 48/18 |
| 2018/0139788 A1 | 5/2018 | Jhunjhunwala et al. | |

FOREIGN PATENT DOCUMENTS

| | | |
|---|---|---|
| EP | 2009947 | 12/2008 |
| EP | 2063623 | 5/2009 |

OTHER PUBLICATIONS

EPO, Extended European Search Report for EP Application No. 20902799.4, Oct. 26, 2022.

* cited by examiner

| | | SUB service status | | |
|---|---|---|---|---|
| | | Normal service | Limited service | Out of service |
| Service RAT type | Circuit-switched (CS) | 1 | 3 | 5 |
| | Packet-switched (PS) | 2 | 4 | 6 |

FIG. 5

| case | service status of SUB1 | service RAT of SUB1 | service status of SUB2 | service RAT of SUB2 | SUB selection order |
|---|---|---|---|---|---|
| 6A | normal | LTE | limited | GSM | SUB1 > SUB2 > NO_SIM |
| 6B | OOS | N/A | limited | WCDMA | SUB2 > SUB1 > NO_SIM |
| 6C | normal | LTE | normal | WCDMA | SUB2 > SUB1 > NO_SIM |
| 6D | N/A | N/A | normal | WCDMA | SUB2 > NO_SIM |
| 6E | N/A | N/A | N/A | N/A | NO_SIM |
| 6F | normal | LTE (data service only) | normal | LTE | SUB2 > NO_SIM |

FIG. 6

| service status of SUB1 | service RAT of SUB1 | service status of SUB2 | service RAT of SUB2 | SUB selection order |
|---|---|---|---|---|
| normal | LTE | limited | GSM | SUB1 > SUB2 > NO_SIM |

| SUB | RAT selection order |
|---|---|
| SUB1 | LTE > WCDMA > Wi-Fi (if VoWi-Fi is supported and available) |
| SUB2 | GSM > LTE > Wi-Fi (if VoWi-Fi is supported and available) |
| NO_SIM | WCDMA > LTE |

FIG. 7

| service status of SUB1 | service RAT of SUB1 | service status of SUB2 | service RAT of SUB2 | SUB selection order |
|---|---|---|---|---|
| normal | LTE | limited | GSM | SUB1 > SUB2 > NO_SIM |

| SUB | RAT selection order |
|---|---|
| SUB1 | LTE > WCDMA > TDSCDMA > GSM > CDMA > 5G > Wi-Fi (if VoWi-Fi is supported and available) |
| SUB2 | GSM > LTE > WCDMA > TDSCDMA > CDMA > 5G > Wi-Fi (if VoWi-Fi is supported and available) |
| NO_SIM | WCDMA > TDSCDMA > GSM > CDMA > LTE |

FIG. 8

| service status of SUB1 | service RAT of SUB1 | service status of SUB2 | service RAT of SUB2 | SUB selection order |
|---|---|---|---|---|
| normal | LTE | limited | GSM | SUB1 > SUB2 > NO_SIM |

| SUB | RAT selection order |
|---|---|
| SUB1 | WCDMA > GSM > LTE > TDSCDMA > 5G > Wi-Fi (if VoWi-Fi supported and available) |
| SUB2 | WCDMA > GSM > LTE > TDSCDMA > 5G > Wi-Fi (if VoWi-Fi supported and available) |
| NO_SIM | WCDMA > TDSCDMA > GSM > CDMA > LTE |

FIG. 9

| service status of SUB1 | service RAT of SUB1 | service status of SUB2 | service RAT of SUB2 | SUB selection order |
|---|---|---|---|---|
| normal | LTE | limited | GSM | SUB1 > SUB2 > NO_SIM |

| SUB | RAT selection order |
|---|---|
| SUB1 | CDMA > LTE > Wi-Fi (if VoWi-Fi supported and available) |
| SUB2 | CDMA > LTE > Wi-Fi (if VoWi-Fi supported and available) |
| NO_SIM | WCDMA > TDSCDMA > GSM > CDMA > LTE |

FIG. 10

| case | service status of SUB1 | service RAT of SUB1 | service status of SUB2 | service RAT of SUB2 | SUB selection order | SUB originating order |
|---|---|---|---|---|---|---|
| 11A | normal | LTE | limited | GSM | SUB1 > SUB2 > NO_SIM | SUB1 (AUTO) > SUB1 (CS) > SUB2 (AUTO) > SUB2 (CS) > NO_SIM (AUTO) > NO_SIM (CS) |
| 11B | OOS | N/A | limited | WCDMA | SUB2 > SUB1 > NO_SIM | SUB2 (AUTO) > SUB2 (CS) > SUB1 (AUTO) > SUB1 (CS) > NO_SIM (AUTO) > NO_SIM (CS) |
| 11C | normal | LTE | normal | WCDMA | SUB2 > SUB1 > NO_SIM | SUB2 (AUTO) > SUB2 (CS) > SUB1 (AUTO) > SUB1 (CS) > NO_SIM (AUTO) > NO_SIM (CS) |
| 11D | N/A | N/A | normal | WCDMA | SUB2 > NO_SIM | SUB2 (AUTO) > SUB2 (CS) > SUB1 (AUTO) > SUB1 (CS) > NO_SIM (AUTO) > NO_SIM (CS) |
| 11E | N/A | N/A | N/A | N/A | NO_SIM | NO_SIM (AUTO) > NO_SIM (CS) |

FIG. 11

| case | service status of SUB1 | service RAT of SUB1 | service status of SUB2 | service RAT of SUB2 | SUB selected by user |
|---|---|---|---|---|---|
| 12A | normal | LTE | limited | GSM | SUB2 |
| 12B | OOS | N/A | limited | WCDMA | SUB1 |
| 12C | normal | LTE | normal | WCDMA | SUB1 |
| 12D | N/A | N/A | normal | WCDMA | SUB2 |

METHOD AND DEVICE FOR PREPARING EMERGENCY CALL AND STORAGE MEDIUM

CROSS-REFERENCE TO RELATED APPLICATIONS

This application is a continuation of International Application No. PCT/CN2020/128749, filed Nov. 13, 2020, which claims priority to U.S. Provisional Application No. 62/949,360, filed Dec. 17, 2019, the entire disclosures of which are incorporated herein by reference.

TECHNICAL FIELD

Aspects of the disclosure relate to cellular telephony and more particular to a method for preparing an emergency call, a device for preparing an emergency call, and a storage medium.

BACKGROUND

A mobile device may be used to place a call for emergency services (an "emergency call") by dialing a predetermined number (e.g., '911') that is recognized by the network as a request for connection to emergency services.

SUMMARY OF THE INVENTION

A method for preparing an emergency call on a device comprises detecting that a user of the device has initiated an emergency call, obtaining an indication of a current geographical location of the device, and, in response to the detecting and based on the obtained indication, selecting an emergency number to be called for the emergency call.

A device for preparing an emergency call includes a memory configured to store correspondences between indications of geographical location and associated emergency numbers; and a processor coupled to the memory and configured to perform a method comprising detecting that a user of the device has initiated an emergency call, obtaining an indication of a current geographical location of the device, and, in response to the detecting and based on the obtained indication and a stored correspondence, selecting an emergency number to be called for the emergency call.

A non-transitory computer-readable storage medium storing computer-executable instructions, which when executed by one or more processors, cause the one or more processors to execute: detecting that a user of the device has initiated an emergency call, obtaining an indication of a current geographical location of the device, and selecting an emergency number to be called for the emergency call in response to the detecting, and based on the obtained indication.

BRIEF DESCRIPTION OF THE DRAWINGS

Aspects of the disclosure are illustrated by way of example. In the accompanying figures, like reference numbers indicate similar elements.

DETAILED DESCRIPTION OF THE INVENTION

It may be desirable for a mobile device (also called a "user equipment" or "UE") to be configured such that when the mobile device is used to make an emergency call, the call is connected as soon as possible and with as high a likelihood of success as possible. Systems, methods, apparatus, and devices as disclosed herein may be implemented to increase a probability that an emergency call placed by a user of a mobile device will be quickly and successfully connected.

Several illustrative configurations will now be described with respect to the accompanying drawings, which form a part hereof. While particular configurations, in which one or more aspects of the disclosure may be implemented, are described below, other configurations may be used and various modifications may be made without departing from the scope of the disclosure or the spirit of the appended claims. For example, it will be apparent to one skilled in the art that these aspects may be practiced without the specific details of a particular configuration. Furthermore, well-known features may be omitted or simplified in order not to obscure the configuration being described.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Unless expressly limited by its context, the term "determining" is used to indicate any of its ordinary meanings, such as deciding, establishing, concluding, calculating, selecting, and/or evaluating. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least." Unless otherwise indicated, the terms "at least one of A, B, and C," "one or more of A, B, and C," "at least one among A, B, and C," and "one or more among A, B, and C" indicate "A and/or B and/or C." Unless otherwise indicated, the terms "each of A, B, and C" and "each among A, B, and C" indicate "A and B and C."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

In the United States of America ("US"), the telephone number '911' is recognized as an emergency number, and telephone networks in the US are configured to direct calls that are placed using the called number '911' to local emergency services. The telephone number '911' is not universally recognized as an emergency number, however, and other countries may use a different number to indicate an emergency call. Bangladesh, Singapore, Malaysia, Hong Kong, and the United Kingdom and many British territories use the telephone number '999,' for example. In the European Union and various other countries, the equivalent emergency number is '112.' The number '000' is used in Australia, the number '108' is used in India, and the number '100' is used in Israel.

A telephone network may be configured to recognize an emergency number from another country and to map calls placed to such a number to a local emergency number. In the US, for example, some carriers map the called number '112' to the emergency number '911.' In Australia, a local network may be configured to map calls to the called number '112' to the local emergency number '000.' Such mapping is not universal, however, and the likely response by a telephone network to a call placed to an unrecognized emergency number is a recorded message indicating an error, such as 'the number you have dialed does not exist.' If the user does not understand the error message (e.g., because the recorded message is in a language that the user does not understand), the user may be unable to determine what the error is and how to avoid it.

Figure 1:
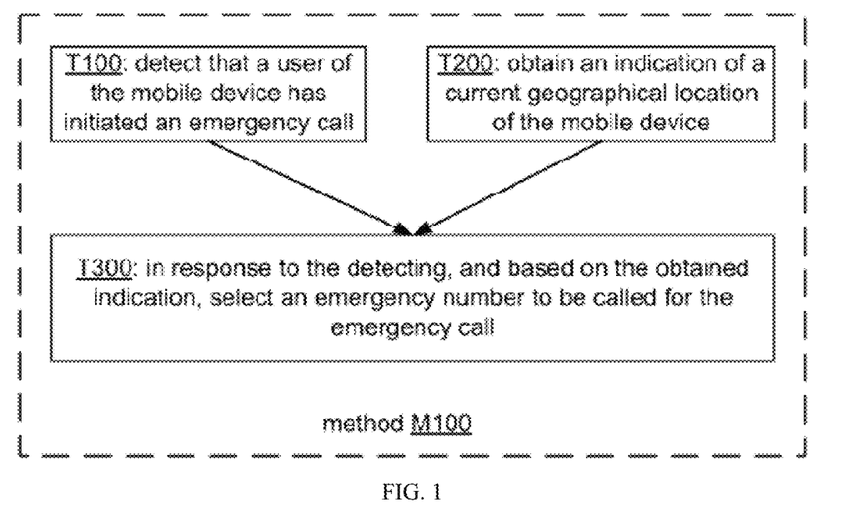
FIG. 1 shows a flowchart of a method M100 of preparing an emergency call on a mobile device according to a general configuration.

FIG. 1 shows a flowchart of a method M100 of preparing an emergency call on a device, for example, a mobile device (e.g., a cellular telephone, such as a smartphone) according to a general configuration that includes tasks T100, T200, and T300. Task T100 detects that a user of the mobile device has initiated an emergency call. Task T200 obtains an indication of a current geographical location of the mobile device. In response to the detecting, and based on the obtained indication, task T300 selects an emergency number to be called for the emergency call.

Task T100 detects that a user of the mobile device has initiated an emergency call. In one example, task T100 detects that the user has dialed an emergency call number. For example, task T100 may be configured to detect that the user entered the numbers 9-1-1 via a keypad and then entered a 'place call' command (e.g., selected a 'place call' icon on a touchscreen of the mobile device). In another example, task T100 detects that the user has entered a command to place an emergency call. For example, task T100 may be configured to detect that the user selected a 'place emergency call' icon or otherwise triggered such a command (e.g., by pressing a panic button that is connected to the mobile device via Bluetooth™ or another short-range communications protocol).

Task T200 obtains an indication of a current geographical location of the mobile device. In one example, task T200 obtains the indication of location from a location subsystem of the mobile device, which may be configured to calculate a location of the mobile device based on received GNSS (e.g., GPS) and/or Wi-Fi signals. Alternatively or additionally, the indication of current geographical location may be based on an identity of the cell on which the mobile device is currently camped (i.e., the cell that has been selected by the mobile device and from which the device plans to receive services) and/or a Location Area Code, Mobile Network Code, and/or Mobile Country Code associated with the cell.

In response to the detecting, and based on the obtained indication of a current geographical location of the mobile device, task T300 selects an emergency number to be called for the emergency call. For a case in which the user has dialed an emergency number for the initiated emergency call, the selected emergency number may be different than the dialed emergency number. For example, if the user dialed '911' but the obtained indication indicates a location in Australia, task T300 may select '000' as the emergency number to be called instead of '911.' Task T300 may be configured to select the emergency number by accessing a stored data structure (e.g., a lookup table) that stores a correspondence between indications of geographical location (e.g., country and/or telephone network) and emergency numbers. In one example, the data structure is provided by a network (e.g., the user's home network) and is stored within a memory of the mobile device during a provisioning operation. Method M100 may also include a task of calling the selected emergency number: for example, by transmitting a call request to a network on which the device is camped which includes the emergency number as the number being called.

A mobile device is typically capable of communicating with a telephone network using different radio access technologies (RATs). Examples of RATs include GSM (Global System for Mobile communications), CDMA (Code Division Multiple Access); WCDMA (Wideband CDMA); TD- SCDMA (Time Division Synchronous CDMA); LTE (Long Term Evolution), 5G (Fifth Generation), and Wi-Fi (IEEE 802.11a/b/g/n/ac/ax). Differences between RATs may include, for example, different uplink and/or downlink radio bands; different multiple-access schemes (e.g., time-division, frequency-division, code-division); whether the RAT is circuit-switched (CS) or packet-switched (PS), etc.

Examples of CS RATs include GSM, CDMA, WCDMA, and TDSCDMA. Examples of PS RATs include LTE and 5G. While a telephone network should accept an emergency call regardless of the particular RAT used to place the call, technical difficulties may exist that prevent the emergency call from being completed. For example, while CS RATs have been in use for decades, PS RATs and related services such as Voice over LTE (VoLTE) are relatively new, and as a consequence, emergency call service may not be fully supported over PS RATs in some countries or geographical areas. For such reasons, the overall likelihood of successful emergency call connection may be higher using a CS RAT than using a PS RAT. If the user initiates an emergency call while the mobile device is currently using a PS RAT, therefore, it may be desirable to switch the mobile device to a CS RAT before the emergency call is placed.

Figure 2:
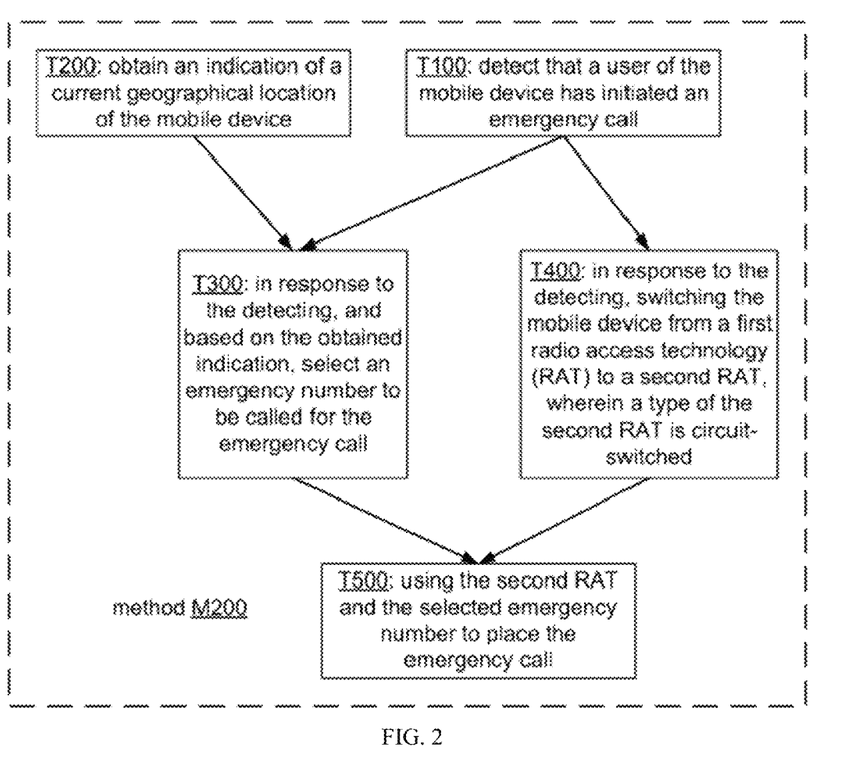
FIG. 2 shows a flowchart of an implementation M200 of method M100.

FIG. 2 shows a flowchart of an implementation M200 of method M100 that includes tasks T400 and T500. In response to detecting that the user has initiated the emergency call, task T400 switches the mobile device from a first radio access technology (RAT) to a second RAT, wherein a type of the second RAT is circuit-switched. Task T500 uses the second RAT and the selected emergency number by task T300 to place the emergency call.

A mobile device stores an International Mobile Subscriber Identity (IMSI) number that uniquely identifies the user. The IMSI is typically stored on a Subscriber Identity Module (SIM), which may be implemented, for example, as a removable card or as an embedded SIM (eSIM). A mobile device may be configured to support more than one SIM, each associated with a corresponding contract between the user and a particular network provider (also called a subscription or SUB), such that the device may be used for different services with different network providers depending on which SUB is active.

One example of a mobile device that supports multiple SIMs is a dual SIM dual active (DSDA) phone. A DSDA phone supports two SIMs and has two transceivers for cellular service, so that the phone is capable of receiving calls on both SIMs at the same time. In contrast, a dual SIM dual standby (DSDS) phone has only one transceiver for cellular service. A DSDS phone may allow both SIMs to be accessed through time multiplexing, but when making or receiving calls, only the active channel is available, and use of the other SIM is unavailable during the duration of the call. Mobile devices that support more than two SIMs are also available.

A SUB has a service status that may change over time. A service status of "normal" indicates that the SUB has been used to register the mobile device with the network on whose cell the mobile device is camped, so that the mobile device may use the SUB to send and receive calls. A service status of "limited" indicates that the SUB has not been used to register the mobile device with the network and that the mobile device cannot use the SUB to make calls normally. Reasons for a limited service status may include that the user's network provider has rejected the registration attempt (e.g., because the user's account is unpaid), that the user's network provider has no roaming agreement with the network on whose cell the mobile device is currently camped, or that the cell on which the mobile device is camped is not fully functional.

A service status of "out-of-service" ("OOS") indicates that the mobile device is not camped on any network. If the mobile device is within the coverage area of the service provider associated with the active subscription, bringing the device into service may take only about ten seconds or less for the device to acquire network timing. If the mobile device is out of area, however, a band scan may be required, which is typically much longer and may take from thirty seconds up to a minute or more.

A service status of "limited" or "OOS" may be temporary. For example, the service status of a SUB may change as a mobile device moves from one network coverage area to another or even from one cell to another. Even when the mobile device is using a SUB that is in a limited service status, most emergency calls will succeed. In some locations, however, the network will not permit a mobile device to make even an emergency call if the account associated with the active SUB is unpaid.

Problems relating to the active SIM in emergency call handling may also arise when the active SIM is designated for data service only (e.g., internet service) and does not support voice service. While it may be possible to use the data service to have a voice or video communication with another user (e.g., via Skype or FaceTime™), in such cases the data-only SIM does not support making an emergency call or any other telephone call on the network. It may be desirable to disable such a SIM (e.g., by detaching it from the network), or switch to another SIM if available, before attempting to place an emergency call with the network.

Figure 3:
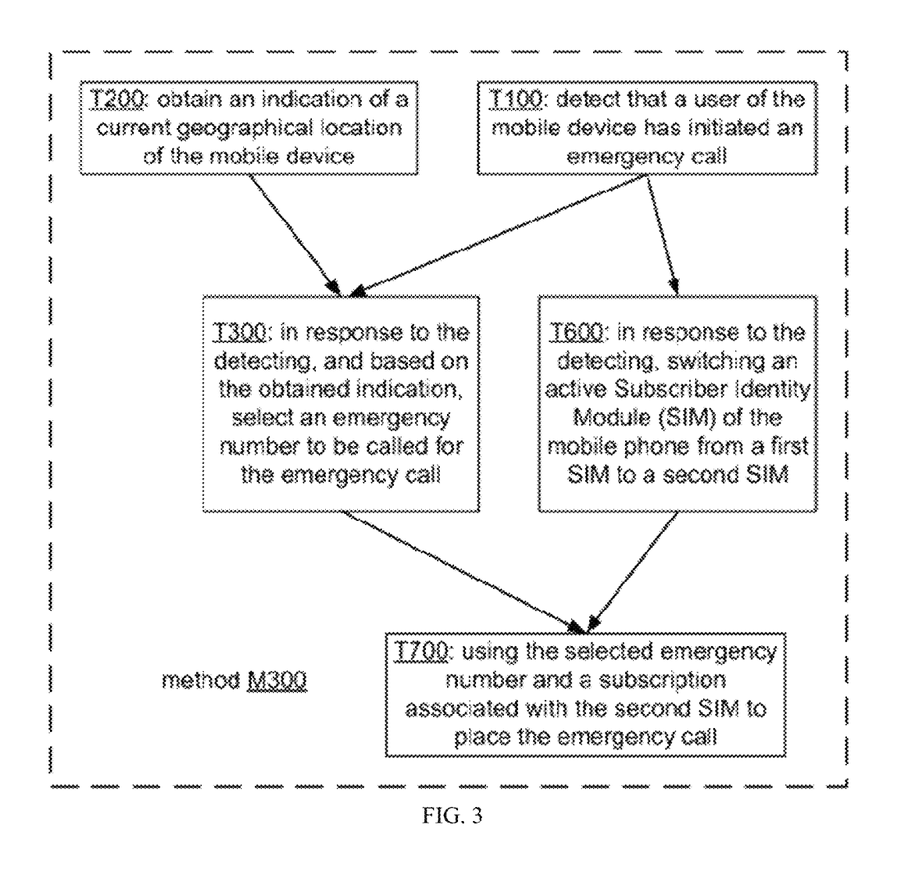
FIG. 3 shows a flowchart of an implementation M300 of method M100.
Figure 4:
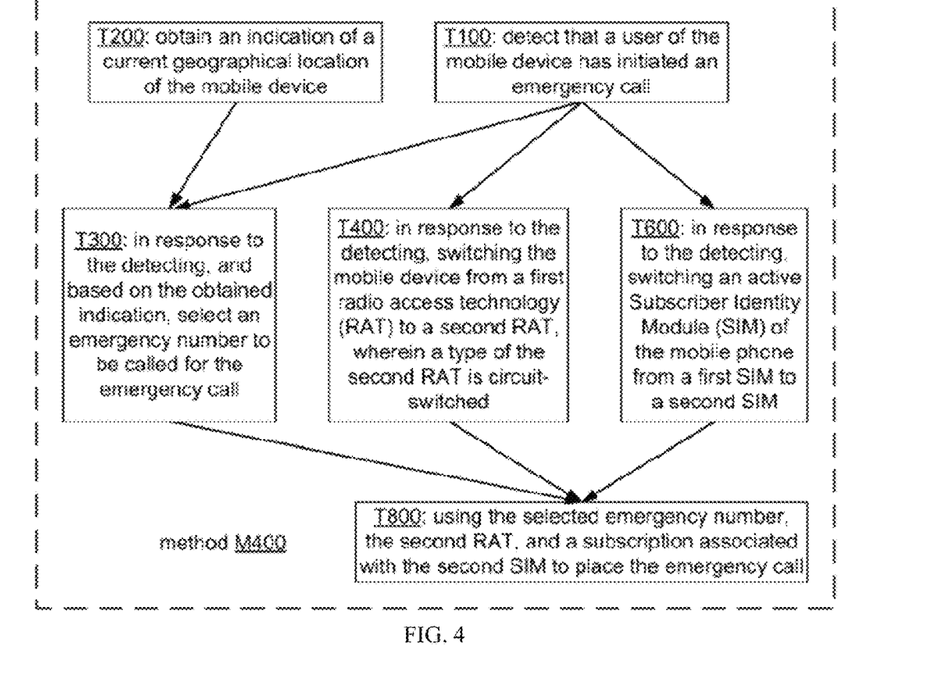
FIG. 4 shows a flowchart of an implementation M400 of methods M100, M200, and M300.

FIG. 3 shows a flowchart of an implementation M300 of method M100 that includes tasks T600 and T700. In response to detecting that the user has initiated the emergency call, task T600 switches an active SIM of the mobile phone from a first SIM to a second SIM. In one example, a current service status of the second SIM is higher than a current service status of the first SIM, where a service status of "normal" is higher than a service status of "limited" and a service status of "out-of-service" is lower than a service status of "normal" or "limited." In another example, the first SIM provides only data service and does not support voice service, and the second SIM does provide voice service. Task T700 uses the selected emergency number, and a subscription that is associated with the second SIM, to place the emergency call. FIG. 4 shows a flowchart of an implementation M400 of methods M100, M200, and M300 that includes tasks T400 and T600 and an implementation T800 of tasks T500 and T700.

Figure 5:
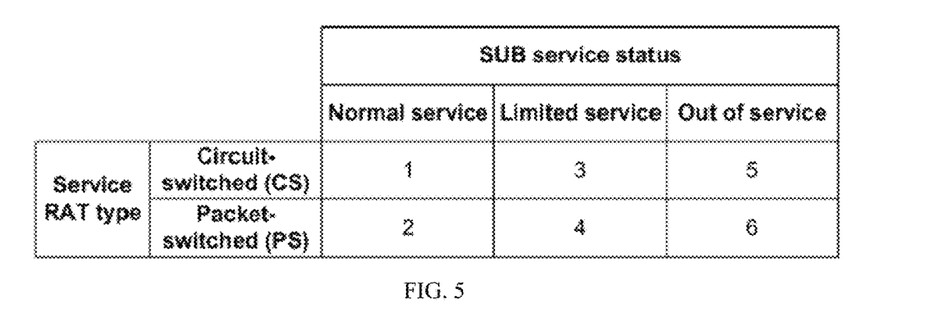
FIG. 5 shows an example of a subscription priority ranking table.

FIG. 5 shows an example of a subscription priority ranking table that may be used to assign a relative priority of '1' (highest) to '6' (lowest) among SUBs with voice support based on current service status and service RAT type as described herein.

Figure 6:
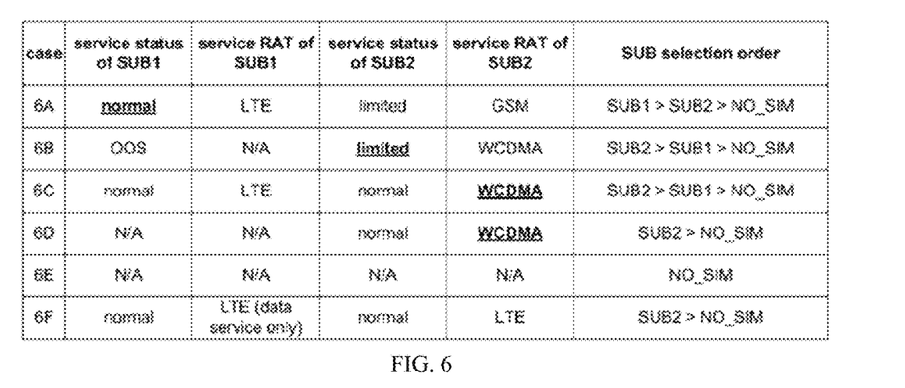
FIG. 6 shows six examples of subscription selection for emergency call placement.

FIG. 6 shows six examples of subscription selection for emergency call placement (e.g., applying an implementation of subscription switching task T600 as described herein), including adding a NO_SIM case as a subscription selection option, excluding data-only subscriptions from selection for emergency call handling, and providing for one or more fallback options (if available) in case of emergency call failure.

In case 6A, subscription SUB1 is selected, even though its service RAT is PS, because it is the only subscription whose current service status is normal. If failure of the emergency call is detected, then the active SUB is changed to SUB2 and the emergency call is retried. If the call fails again, then the active SIM is detached and the emergency call is retried without an active SIM.

In case 6B, subscription SUB2 is selected, because its service status is higher than OOS. If failure of the emergency call is detected, then the active SUB is changed to OOS SUB1 and the emergency call is retried. If the call fails again, then the active SIM is detached and the emergency call is retried without an active SIM.

In case 6C, the current service status of both SUBs is normal, so that the priority of selection among the subscriptions is determined by the corresponding service RAT. In this case, the subscription SUB2 is selected because its service RAT is CS rather than PS. If failure of the emergency call is detected, then the active subscription is changed to SUB1 whose service RAT is PS, and the emergency call is retried. If the call fails again, then the active SIM is detached from the network (e.g., by a modem of the mobile device) and the emergency call is retried without an active SIM.

In case 6D, only one subscription (SUB2) is available, and the emergency call is first attempted using this subscription whose current service status is normal. If failure of the emergency call is detected, then the SIM is detached and the emergency call is retried without an active SIM.

In case 6E, no subscription is available, so the emergency call is attempted without an active SIM.

In case 6F, the subscription SUB1 does not support voice service, so this subscription is excluded from use for emergency call handling. The emergency call is first attempted using subscription SUB2 whose current service status is normal. If failure of the emergency call is detected, then the active SIM is detached and the emergency call is retried without an active SIM.

Once the order of selection among the subscriptions has been determined, it may be desirable to determine an order of RAT selection within each subscription. The various RATs may be classified into three groups: CS cellular RATs, PS cellular RATs, and non-cellular RATs (e.g., WiFi). For a NO_SIM case, only cellular RATs are considered.

Figure 7:
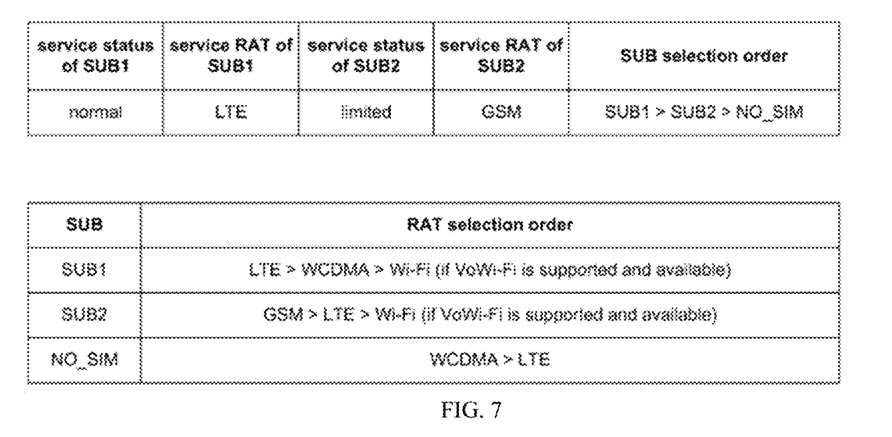
FIGS. 7-10 show examples of several different schemes for RAT selection.
Figure 8:
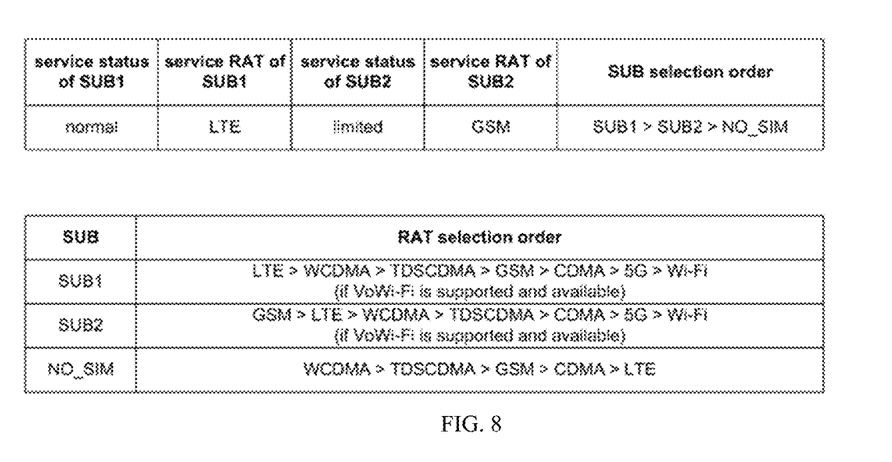

FIGS. 7-10 show examples of several different schemes for RAT selection (e.g., applying an implementation of RAT switching task T400 as described herein), each with reference to the subscription selection case 6A as shown in FIG. 6. FIGS. 7 and 8 show examples in which the service RAT is selected first. Selecting the service RAT first avoids the delay associated with an inter-RAT switch, at least if the initial attempt to place the emergency call using the subscription is successful. In the example of FIG. 7, one RAT from each other group is selected for fallback, with non-cellular RAT (e.g., Voice over WiFi or "VoWiFi") having the lowest priority. The selection priority order within each RAT group may be as follows: WCDMA>TDSCDMA>GSM>CDMA for the group of CS RATs, and LTE>5G for the group of PS RATs. In the example of FIG. 8, if the initial attempt to place the emergency call using the service RAT fails, then the call is retried using all other supported RATs within the active subscription before changing to a different subscription.

Figure 9:
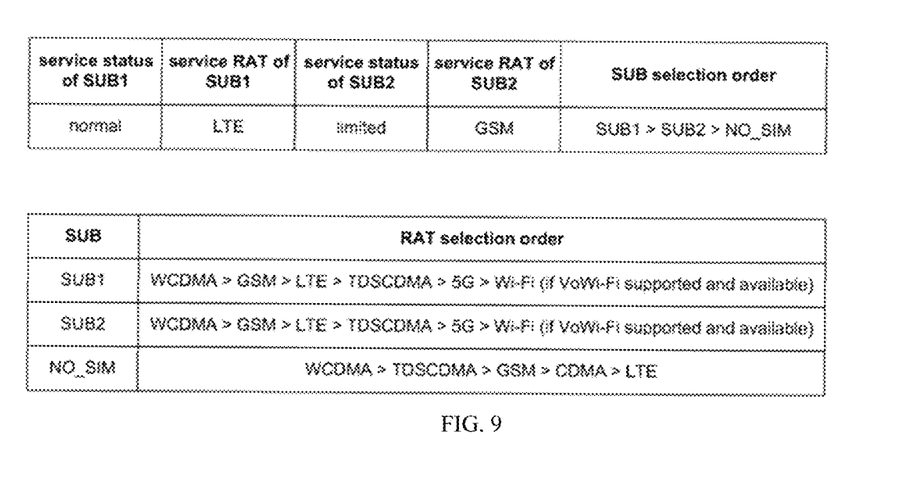
Figure 10:
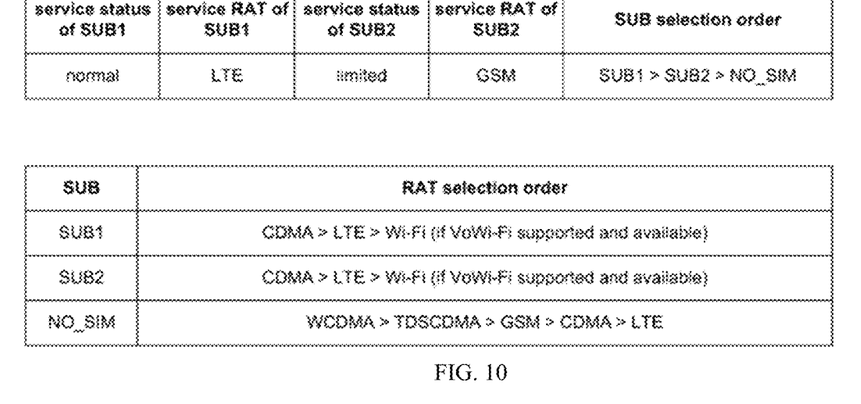

FIGS. 9 and 10 show examples in which the highest-priority RAT is selected first within each subscription, rather than the corresponding service RAT. The definition of priority among the RATs may depend on the network operator and may be predefined. FIG. 9 shows an example for a GSM operator, and FIG. 10 shows an example for a CDMA operator.

In FIGS. 7-10, the option of Voice over WiFi (VoWiFi) is shown as a lowest-priority option if supported and available. Alternatively, it may be desirable to assign a higher priority—even a highest priority—to the option of VoWiFi. In a location with strong WiFi coverage (e.g., a home or office), connection of the mobile device to the network via this RAT may be more reliable than connection via a cellular RAT.

Figure 11:
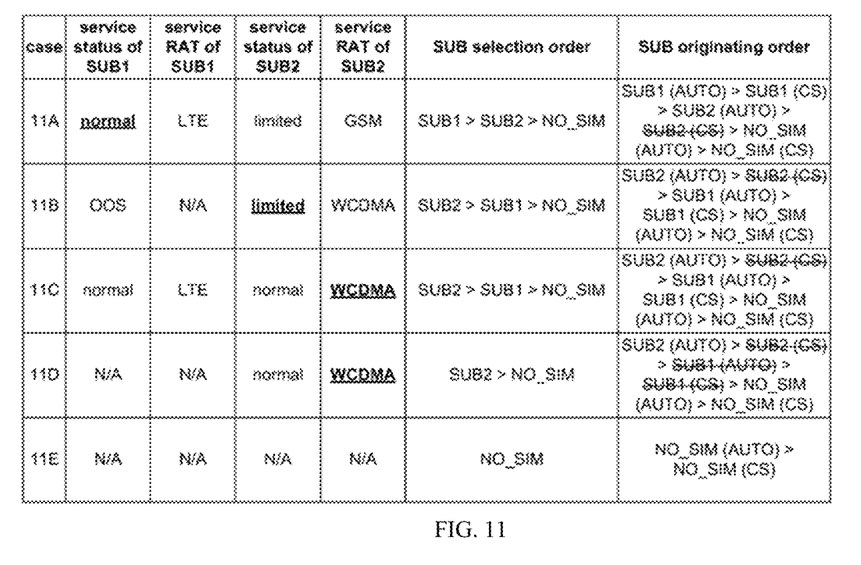
FIG. 11 shows a different scheme of selecting RATs within each subscription.

FIG. 11 shows a different scheme of selecting RATs within each subscription, as applied to cases 6A-6E of FIG. 6 (shown here as cases 11A-11E, respectively). In this scheme, the initial RAT selection is automatic and not predetermined. For example, the initial RAT selection may be performed by a modem of the mobile device, and the service RAT may or may not be the initial selection. In this example, if the emergency call fails using the initial RAT selection, and the initial RAT is not a CS RAT, then the call is retried using a CS RAT before changing to a different subscription. Accordingly, the option "SUB2 (CS)" is struck out in cases 11A-11D, because this option was already tried in each case as the initial RAT selection for subscription SUB2.

Figure 12:
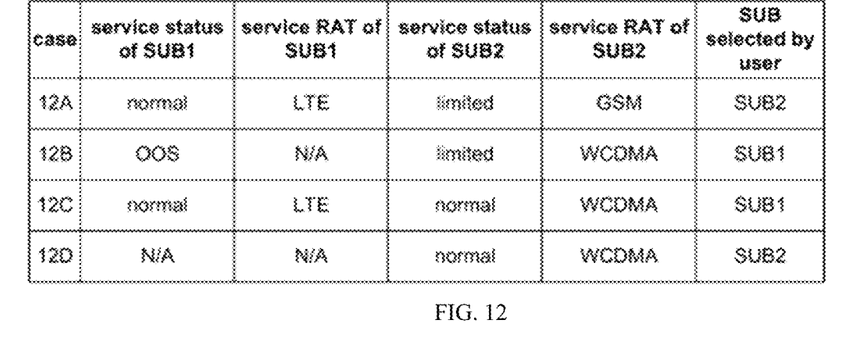
FIG. 12 shows examples of four different cases in which emergency call failure and/or delay may occur.

FIG. 12 shows examples of four different cases in which emergency call failure and/or delay may occur. In case 12A, the network requires an emergency call to be dialed as a normal telephone call, which requires the active SUB to have normal service status. Because the subscription SUB2 has only a limited service status, selection of this SUB to place an emergency call will lead to failure. Selecting a subscription having a current service status for the initial emergency call attempt as described herein may avoid such a failure.

In case 12B, the selected subscription SUB1 is out of service. Before the emergency call can be made, the mobile device will need to perform a scan in order to camp on the network before making the call, and additional delay will be introduced. Switching to a subscription having a limited service status for the initial emergency call attempt as described herein may avoid such a delay.

In case 12C, the LTE network rejects the emergency call request (e.g., because the network does not support emergency call carriage over PS RAT). Because repeated attempts to place the emergency call in the same manner will also fail, the emergency call may not succeed unless switching of the RAT and/or of the active subscription as described herein is performed. In such a case, it may be desirable to detect the failure and to switch the RAT and/or SUB before retrying the call.

In detecting an emergency call failure, it may be desirable to distinguish among a temporary reason for failure (e.g., network congestion), a subscription-based reason for failure (e.g., a refusal by the network to register the subscription), and a RAT-based reason for failure (e.g., a defective cell, lack of support for emergency calling over a PS RAT). In the case of a temporary reason, the call may be retried using the same SUB and RAT. In the case of a RAT-based reason for failure, switching to a different RAT (e.g., to a CS RAT) may be performed before the emergency call is retried.

In the case of a subscription-based reason for failure, the active subscription may be switched, or the active SIM may be detached from the network, before the emergency call is retried. In case 12D, for example, if the subscription SUB2 is not authorized by the network and the emergency call is rejected for this reason, retry under the same subscription is not likely to succeed, and it may be desirable to detach the SIM may from the network before the emergency call is retried (e.g., as a NO_SIM case).

Figure 13:
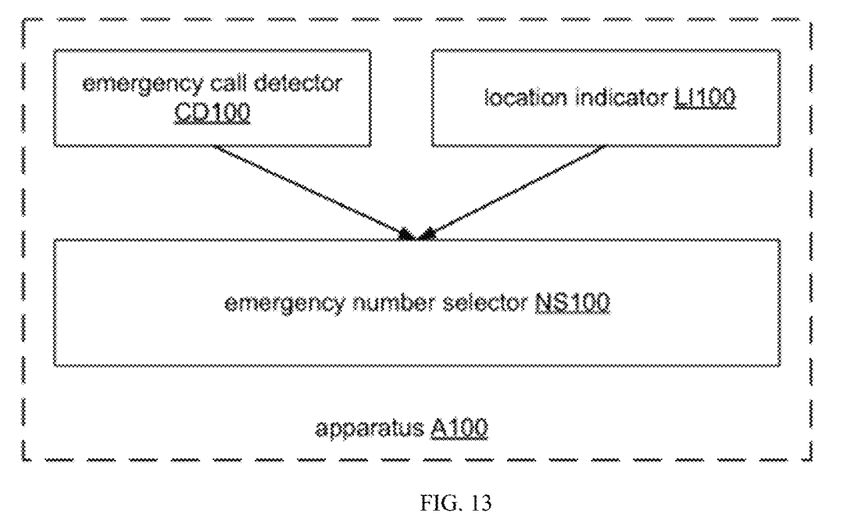
FIG. 13 shows a block diagram of an apparatus A100 according to a general configuration.

FIG. 13 shows a block diagram of an apparatus A100 for preparing an emergency call on a mobile device (e.g., a cellular telephone, such as a smartphone) according to a general configuration that includes emergency call detector CD100, location indicator LI100, and emergency number selector NS100. Emergency call detector CD100 is configured to detect that a user of the mobile device has initiated an emergency call (e.g., as described herein with reference to task T100). Location indicator LI100 is configured to obtain an indication of a current geographical location of the mobile device (e.g., as described herein with reference to task T200). Emergency number selector NS100 is configured to select, in response to the detecting and based on the obtained indication, an emergency number to be called for the emergency call (e.g., as described herein with reference to task T300).

Figure 14:
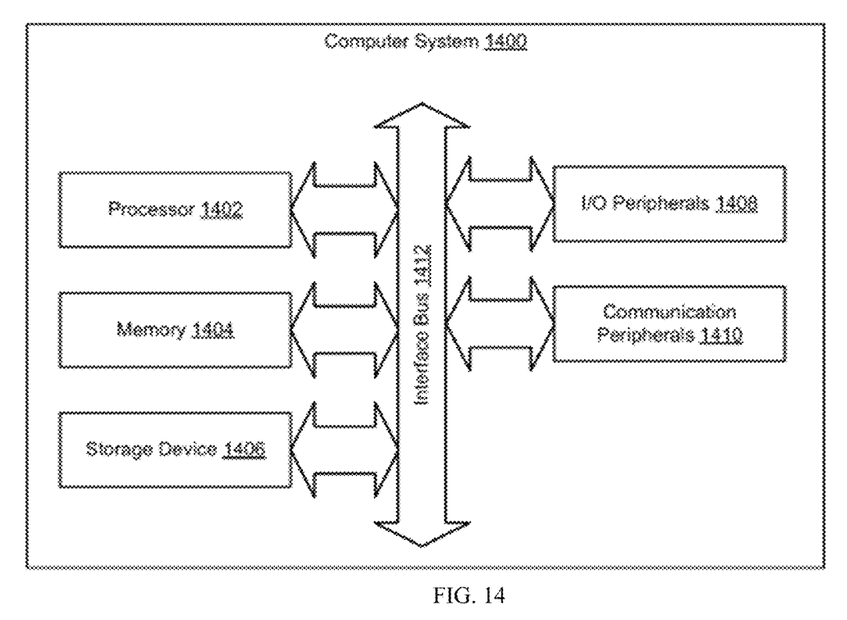
FIG. 14 shows a block diagram of a computer system 1400.

FIG. 14 illustrates examples of components of a computer system 1400 that may be configured to perform an implementation of a method as described herein (e.g., method M100, M200, M300, or M400). Although these components are illustrated as belonging to a same computer system 1400 (e.g., a smartphone), computer system 1400 may also be implemented such that the components are distributed (e.g., among different servers, among a smartphone and one or more network entities, etc.).

The computer system 1400 includes at least a processor 1402, a memory 1404, a storage device 1406, input/output peripherals (I/O) 1408, communication peripherals 1410, and an interface bus 1412. The interface bus 1412 is configured to communicate, transmit, and transfer data, controls, and commands among the various components of the computer system 1400. The memory 1404 and the storage device 1406 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1404 and the storage device 1406 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 1400.

Further, the memory 1404 includes an operating system, programs, and applications. The processor 1402 is configured to execute the stored instructions and includes, for example, a logical processing unit, a microprocessor, a digital signal processor, and other processors. The memory 1404 and/or the processor 1402 can be virtualized and can be hosted within another computer system of, for example, a cloud network or a data center. The I/O peripherals 1408 include user interfaces, such as a keyboard, screen (e.g., a touch screen), microphone, speaker, other input/output devices (e.g., a camera configured to capture the images to be indexed), and computing components, such as graphical processing units, serial ports, parallel ports, universal serial buses, and other input/output peripherals. The I/O peripherals 1408 are connected to the processor 1402 through any of the ports coupled to the interface bus 1412. The communication peripherals 1410 are configured to facilitate communication between the computer system 1400 and other computing devices (e.g., cloud computing entities configured to perform portions of indexing and/or query searching methods as described herein) over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computer system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The various elements of an implementation of an apparatus or system as disclosed herein (e.g., apparatus A100) may be embodied in any combination of hardware with software and/or with firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs (digital signal processors), FPGAs (field-programmable gate arrays), ASSPs (application-specific standard products), and ASICs (application-specific integrated circuits). A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100, M200, M300, or M400 (or another method as disclosed with reference to operation of an apparatus or system described herein), such as a task relating to another operation of a device or system in which the processor is embedded (e.g., a voice communications device, such as a smartphone, or a smart speaker). It is also possible for part of a method as disclosed herein to be performed under the control of one or more other processors.

Each of the tasks of the methods disclosed herein (e.g., methods M100, M200, M300, and/or M400) may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

In one example, a non-transitory computer-readable storage medium comprises code which, when executed by at least one processor, causes the at least one processor to perform a method for preparing an emergency call on a mobile device as described herein (e.g., method M100, M200, M300, or M400). Further examples of such a storage medium include a medium further comprising code which, when executed by the at least one processor, causes the at least one processor to perform a method for preparing an emergency call on a device as described herein.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

The invention claimed is:

1. A method for preparing an emergency call on a device, the method comprising:
   detecting that a user of the device has initiated an emergency call;
   obtaining an indication of a current geographical location of the device; and
   selecting an emergency number to be called for the emergency call in response to the detecting, and based on the obtained indication;
   wherein the method further comprises:
      switching the device from a first radio access technology (RAT) to a second RAT in response to the detecting, wherein a type of the second RAT is circuit-switched;
      switching an active Subscriber Identity Module (SIM) of the device from a first SIM to a second SIM in response to the detecting; and
      using the selected emergency number, a subscription associated with the second SIM, and the second RAT to place the emergency call.

2. The method according to claim 1, wherein detecting that the user has initiated the emergency call comprises:
   detecting that the user has dialed the emergency number, wherein the selected emergency number is different than the dialed emergency number.

3. The method according to claim 1, wherein a current service status of the second SIM is higher than a current service status of the first SIM.

4. The method according to claim 1, wherein the switching is based on an indication that the first SIM does not support voice service.

5. A device for preparing an emergency call, the device comprising:
   a memory configured to store correspondences between indications of geographical location and associated emergency numbers; and
   a processor coupled to the memory and configured to:
      detect that a user of the device has initiated an emergency call;
      obtain an indication of a current geographical location of the device; and
      select an emergency number to be called for the emergency call in response to the detecting that the user of the device has initiated the emergency call, and based on the obtained indication and a stored correspondence;
   wherein the processor is further configured to:
      switch the device from a first radio access technology (RAT) to a second RAT in response to detecting that the user of the device has initiated the emergency call, wherein a type of the second RAT is circuit-switched;
      switch an active Subscriber Identity Module (SIM) of the device from a first SIM to a second SIM in response to detecting that the user of the device has initiated the emergency call; and
      use the selected emergency number, a subscription associated with the second SIM, and the second RAT to place the emergency call.

6. The device according to claim 5, wherein detecting that the user has initiated an emergency call includes:
   detecting that the user has dialed the emergency number, wherein the selected emergency number is different than the dialed emergency number.

7. The device according to claim 5, wherein a current service status of the second SIM is higher than a current service status of the first SIM.

8. The device according to claim 5, wherein the switching is based on an indication that the first SIM does not support voice service.

9. A non-transitory computer-readable storage medium storing computer-executable instructions, which when executed by one or more processors, cause the one or more processors to execute:
   detecting that a user of a device has initiated an emergency call;
   obtaining an indication of a current geographical location of the device; and
   selecting an emergency number to be called for the emergency call in response to detecting that the user of the device has initiated the emergency call, and based on the obtained indication;
   wherein the computer-executable instructions are further executed by the processor to:
      switch the device from a first radio access technology (RAT) to a second RAT in response to detecting that the user of the device has initiated the emergency call, wherein a type of the second RAT is circuit-switched;
      switch an active Subscriber Identity Module (SIM) of the device from a first SIM to a second SIM in response to detecting that the user of the device has initiated the emergency call; and
      use the selected emergency number, a subscription associated with the second SIM, and the second RAT to place the emergency call.

10. The medium according to claim 9, wherein the computer-executable instructions which cause the one or more processors to execute detecting that the user has initiated an emergency call further cause the one or more processors to execute:
   detecting that the user has dialed an emergency number, wherein the selected emergency number is different than the dialed emergency number.

11. The medium according to claim 9, wherein a current service status of the second SIM is higher than a current service status of the first SIM.

12. The medium according to claim 9, wherein the switching is based on an indication that the first SIM does not support voice service.

* * * * *